(12) United States Patent
Shishido

(10) Patent No.: US 9,787,859 B2
(45) Date of Patent: Oct. 10, 2017

(54) IMAGE PROCESSING SYSTEM, INFORMATION PROCESSING DEVICE, AND NON-TRANSITORY COMPUTER READABLE MEDIUM FOR MANAGING A CONSUMABLE ITEM

(71) Applicant: FUJI XEROX CO., LTD., Tokyo (JP)

(72) Inventor: Rie Shishido, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/042,216

(22) Filed: Feb. 12, 2016

(65) Prior Publication Data
US 2017/0064093 A1   Mar. 2, 2017

(30) Foreign Application Priority Data

Sep. 1, 2015   (JP) ................................. 2015-171754

(51) Int. Cl.
*H04N 1/00* (2006.01)
*G06Q 10/08* (2012.01)

(52) U.S. Cl.
CPC ....... *H04N 1/00034* (2013.01); *G06Q 10/087* (2013.01); *H04N 1/00015* (2013.01); *H04N 1/00023* (2013.01); *H04N 1/00079* (2013.01); *H04N 1/00204* (2013.01); *H04N 2201/0094* (2013.01)

(58) Field of Classification Search
CPC .......................... H04N 1/00034; G06Q 10/087
USPC ......... 358/1.15, 1.9; 399/11, 12, 24; 347/19; 702/188
See application file for complete search history.

(56) References Cited

U.S. PATENT DOCUMENTS

| 2003/0193685 A1* | 10/2003 | Kageyama | .............. G06F 3/121 358/1.14 |
| 2004/0168092 A1* | 8/2004 | Adachi | ................... G06F 21/31 726/6 |

(Continued)

FOREIGN PATENT DOCUMENTS

| JP | 11-309878 A | 11/1999 |
| JP | 2002-63434 A | 2/2002 |

(Continued)

*Primary Examiner* — Jamares Q Washington
(74) *Attorney, Agent, or Firm* — Sughrue Mion, PLLC

(57) ABSTRACT

An image processing system includes an image processing device, a general user device, and an administrator device. The general user device includes the following elements. A first obtaining unit obtains remaining-amount information concerning a consumable item. A first controller performs control so that image information representing the remaining-amount information is displayed. A first inputting unit allows an input of a request to order the consumable item. A first sender sends the request. The image processing device includes an order request receiver and a providing unit providing information concerning the request. The administrator device includes the following elements. A second obtaining unit obtains the remaining-amount information and the request information. A second controller performs control so that image information indicating the remaining-amount information and the request information are displayed. A second inputting unit allows an input of an order for the consumable item. A second sender sends the order.

11 Claims, 9 Drawing Sheets

(56) References Cited

U.S. PATENT DOCUMENTS

| | | | | |
|---|---|---|---|---|
| 2006/0039707 A1* | 2/2006 | Mima | ................. | B41J 2/17546 |
| | | | | 399/23 |
| 2012/0176636 A1* | 7/2012 | Ormond | ............. | G03G 15/5079 |
| | | | | 358/1.13 |
| 2012/0236359 A1 | 9/2012 | Mihara | | |
| 2013/0028616 A1 | 1/2013 | Kunihiro et al. | | |

FOREIGN PATENT DOCUMENTS

| JP | 2008-146631 A | 6/2008 |
|---|---|---|
| JP | 2012-190400 A | 10/2012 |
| JP | 2013-30011 A | 2/2013 |
| JP | 2013-94962 A | 5/2013 |

* cited by examiner

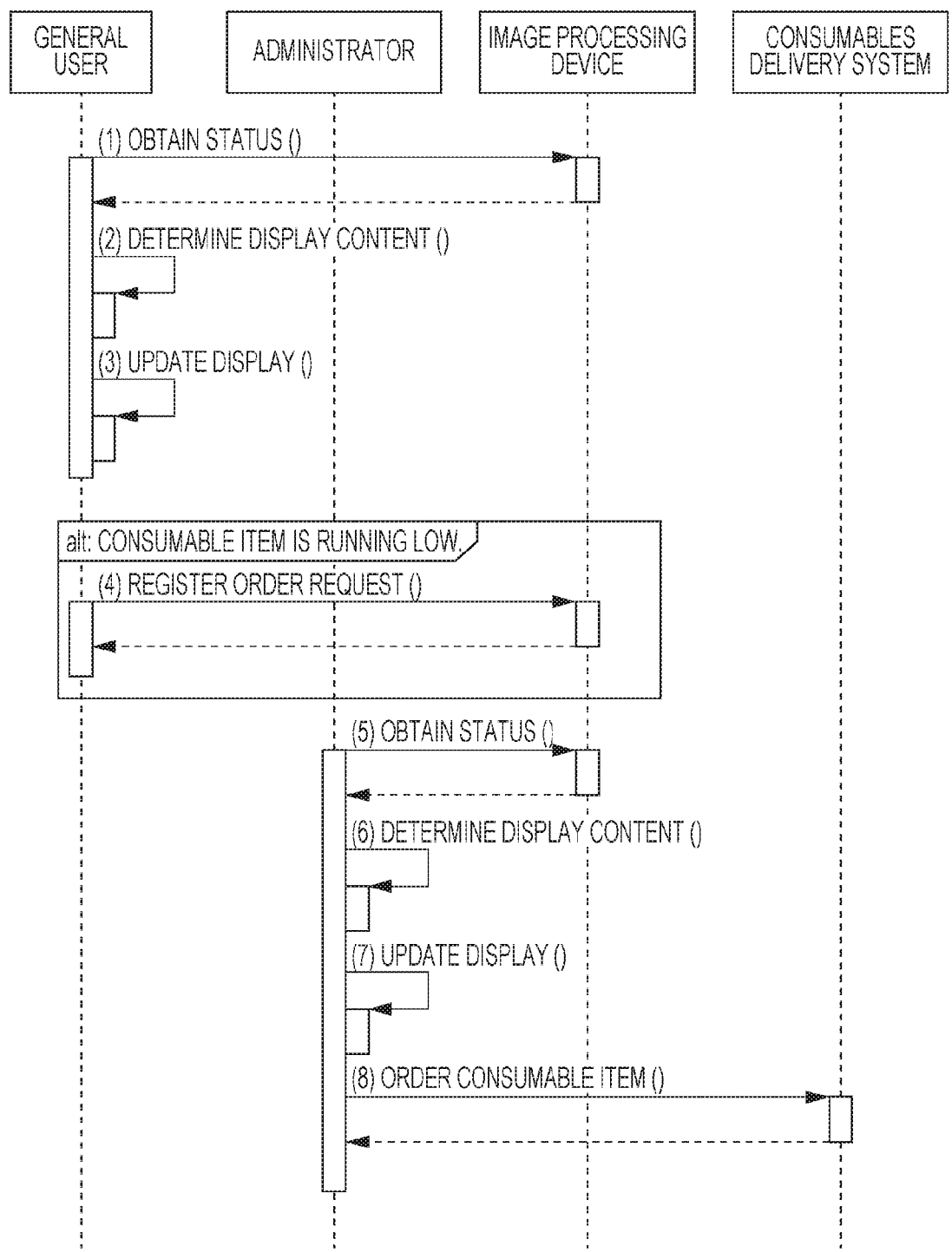

IMAGE PROCESSING SYSTEM, INFORMATION PROCESSING DEVICE, AND NON-TRANSITORY COMPUTER READABLE MEDIUM FOR MANAGING A CONSUMABLE ITEM

CROSS-REFERENCE TO RELATED APPLICATIONS

This application is based on and claims priority under 35 USC 119 from Japanese Patent Application No. 2015-171754 filed Sep. 1, 2015.

BACKGROUND (i) Technical Field

The present invention relates to an image processing system, an information processing device, and a non-transitory computer readable medium.

(ii) Related Art

There may be a case in which an administrator (may also be called a key operator) is selected among users of an image processing device, such as a multifunction device, installed in the office, and the management of the image processing device is entrusted to this administrator. A tool for managing consumables, such as toner cartridges fixed in an image processing device, may be installed in a personal computer (PC) of the administrator of the image processing device. By using this tool, information concerning the remaining amount of each consumable item or warning information indicating that the remaining amount of a certain consumable item has reached a threshold is received from the image processing device, and is displayed on the screen of the administrator's PC. Some tools enable the administrator to order consumables from a consumables delivery system in a service center via the Internet.

In an alternative example, a device driver (printer driver) for an image processing device to be installed in a PC has the function of displaying a consumables order screen.

SUMMARY

According to an aspect of the invention, there is provided an image processing system including an image processing device, a general user device, and an administrator device. The general user device includes the following elements. A first obtaining unit obtains remaining-amount information which indicates a remaining amount of a consumable item from the image processing device. A first controller performs control so that first image information which represents the remaining-amount information obtained by the first obtaining unit is displayed. A first inputting unit allows an input of a request to order the consumable item. A first sender sends the inputted request to order the consumable item to the image processing device. The image processing device includes the following elements. An order request receiver receives the request to order the consumable item from the general user device. A providing unit provides information concerning the request to order received by the order request receiver to the administrator device. The administrator device includes the following elements. A second obtaining unit obtains the remaining-amount information which represents the remaining amount of the consumable item and the information concerning the request to order made by the general user device from the image processing device. A second controller performs control so that image information indicating the remaining-amount information and the information concerning the request obtained by the second obtaining unit are displayed. A second inputting unit allows an input of an order for the consumable item. A second sender sends the order for the consumable item to a consumables delivery system.

BRIEF DESCRIPTION OF THE DRAWINGS

An exemplary embodiment of the present invention will be described in detail based on the following figures, wherein:

FIG. 12 illustrates an example of a flow of the system processing of an exemplary embodiment.

DETAILED DESCRIPTION

Figure 1:
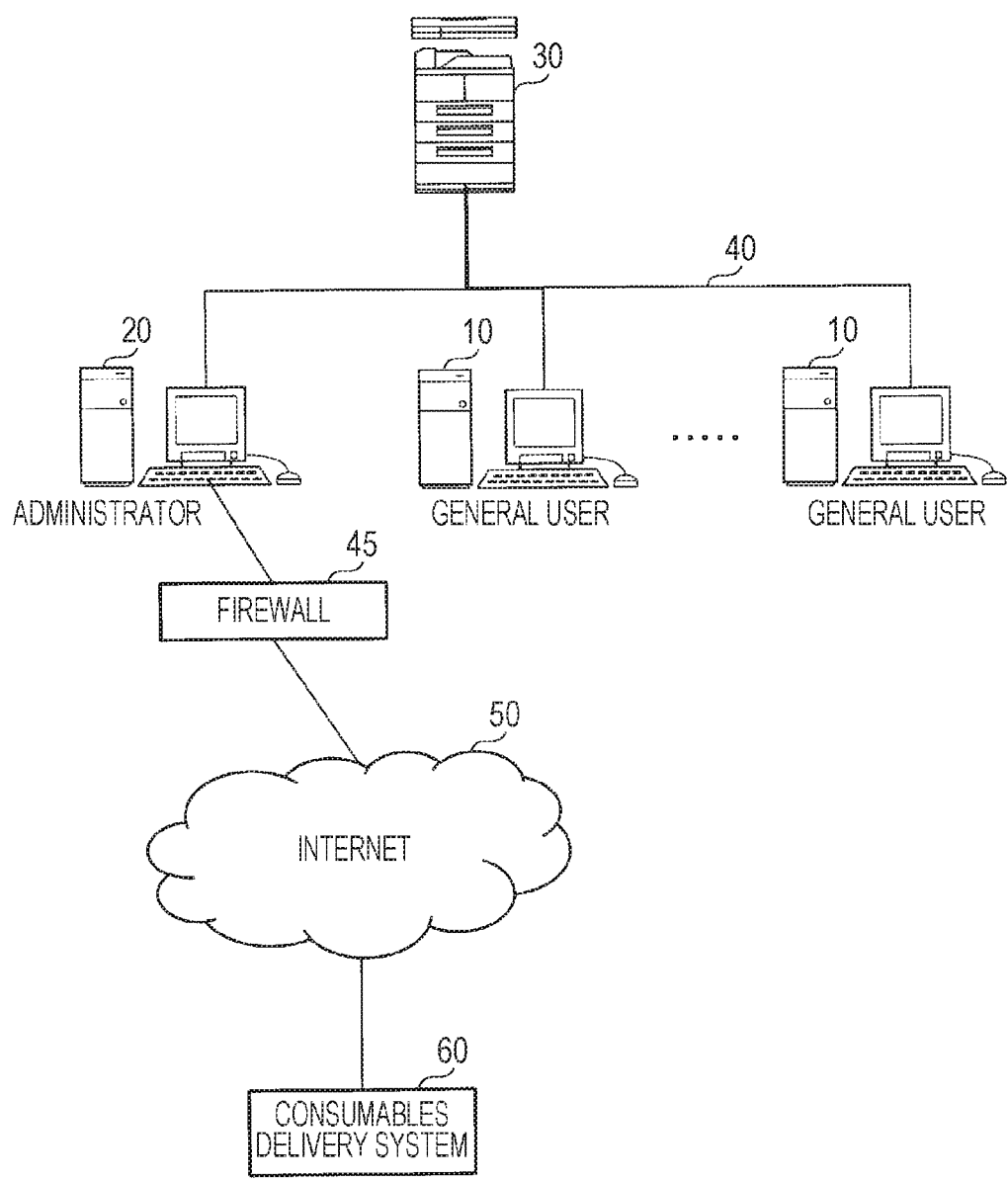
FIG. 1 illustrates an example of the system configuration of an exemplary embodiment.

An example of the system configuration of an exemplary embodiment is shown in FIG. 1. In this system, PCs 10 of general users (hereinafter a PC 10 of a general user may also be called a general user PC 10), a PC 20 of an administrator (hereinafter may also be called an administrator PC 20), and an image processing device 30 are connected to a network 40, such as a local area network (LAN).

The image processing device 30 is a device having the function of printing an image on a sheet, such as a printer, a copying machine, and a multifunction device (a device having multiple functions as a printer, a scanner, and a copying machine, for example). Consumables, such as toner cartridges for toners of multiple colors, are fixed in the image processing device 30.

The image processing device 30 is used by multiple users. Among the users using the image processing device 30, one or few administrators who manage the image processing device 30 are selected. The users other than the administrator will be referred to as "general users".

The general users and the administrator each check the status of the image processing device 30 and provide a print instruction to the image processing device 30 by using a device driver for the image processing device 30 installed in the corresponding one of the PCs 10 and 20. The function of ordering consumables for the image processing device 30 via a firewall 45 from a consumables delivery system 60 on the Internet 50 is provided in the administrator PC 20. In this exemplary embodiment, this function is integrated into the device driver for the image processing device 30.

The consumables delivery system 60 is a system that receives orders for consumables for the image processing devices 30 installed in various locations from customers, and makes arrangements for delivering the ordered consumables to the customers. The consumables delivery system 60 is installed in, for example, a service center that undertakes maintenance services for the image processing devices 30.

In this exemplary embodiment, the user who can order consumables for a certain image processing device 30 from the consumables delivery system 60 is restricted to the administrator of this image processing device 30. That is, in the system configuration shown in FIG. 1, general users are unable to order consumables, thereby preventing a situation where consumables are ordered without the administrator's knowledge. On the other hand, in the system configuration shown in FIG. 1, the function of requesting the administrator to order consumables is provided to the general users. Then, information concerning an order request from a general user is provided to the administrator, thereby making it easy for the administrator to realize the need to order some consumables.

In this exemplary embodiment, the function of ordering consumables is integrated into the device driver for the image processing device 30 to be installed in the PC 20, and the function of making an order request is integrated into the device driver for the image processing device 30 to be installed in the PCs 10.

Figure 2:
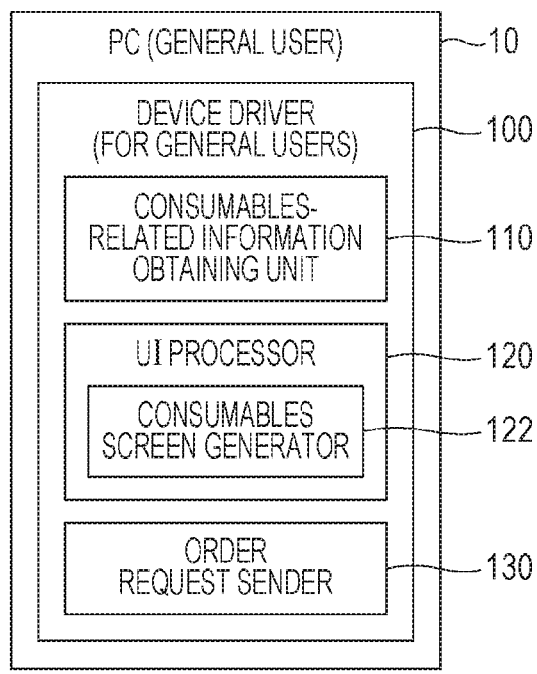
FIG. 2 illustrates an example of the functional configuration of a general user PC regarding processing of an exemplary embodiment.

FIG. 2 illustrates an example of the functional configuration of the general user PC 10 regarding the processing of this exemplary embodiment. In the PC 10, a device driver 100 for controlling the image processing device 30 is installed. The device driver has the function (not shown) of displaying a user interface (UI) screen for setting print settings and of sending information concerning print settings set on the UI screen to the image processing device 30, together with print data. The device driver 100 includes a consumables-related information obtaining unit 110, a UI processor 120, and an order request sender 130. The consumables-related information obtaining unit 110 obtains various items of information related to consumables, such as the remaining amounts of consumables, such as toner, from the image processing device 30. The UI processor 120 performs UI processing concerning the device driver 100. In addition to the function of displaying a UI screen for setting print settings and of obtaining print settings set on the UI screen by a user, the UI processor 120 has a consumables screen generator 122 that generates a UI screen for displaying information concerning consumables and receiving order requests for consumables (such a screen will be called "a consumables screen"). The order request sender 130 sends an order request made on the consumables screen by a general user to the image processing device 30. In this exemplary embodiment, the image processing device 30 receives an order request for a consumable item from a general user and provides information concerning the order request to the administrator.

Figure 3:
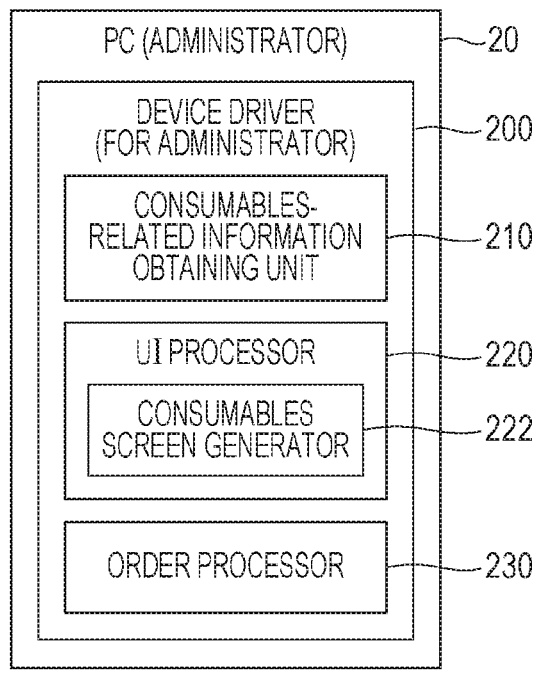
FIG. 3 illustrates an example of the functional configuration of an administrator PC regarding processing of an exemplary embodiment.

FIG. 3 illustrates an example of the functional configuration of the administrator PC 20 regarding the processing of this exemplary embodiment. In the PC 20, a device driver 200 for controlling the image processing device 30 is installed. The functions of the device driver 200 are similar to those of the device driver 100 installed in the general user PC 10. However, some of the functions of the device driver 200 are unique to the administrator. For example, consumables-related information obtained by a consumables-related information obtaining unit 210 of the device driver 200 from the image processing device 30 includes, not only information concerning the remaining amounts of consumables, such as toner, but also information that may be used to determine whether to order consumables, such as information concerning order requests for consumables from general users. The consumables screen generated by a consumables screen generator 222 of a UI processor 220 displays various information that may be used to determine by the administrator whether to accept order requests for consumables and also displays graphical user interface (GUI) elements for receiving an order instruction for consumables. An order processor 230 sends an order instruction received from the administrator on the consumables screen to the consumables delivery system 60.

Figure 4:
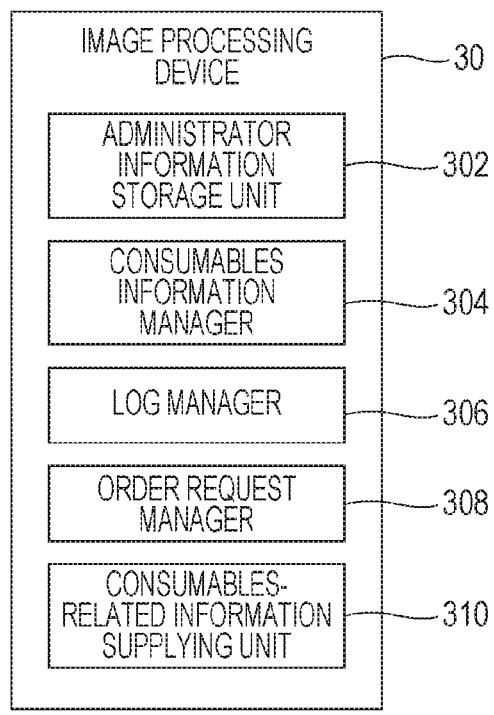
FIG. 4 illustrates an example of the functional configuration of an image processing device regarding processing of an exemplary embodiment.

FIG. 4 illustrates an example of the functional configuration of the image processing device 30 regarding the processing of this exemplary embodiment. The image processing device 30 includes an administrator information storage unit 302, a consumables information manager 304, a log manager 306, an order request manager 308, and a consumables-related information supplying unit 310.

The administrator information storage unit 302 stores therein information concerning the administrator of this image processing device 30. Information concerning the administrator includes user identification (ID) information concerning the administrator and authentication information (such as a password). If there are plural administrators for the image processing device 30, the administrator information storage unit 302 includes information concerning each administrator.

The consumables information manager 304 obtains information concerning the status (for example, the remaining amount) of each consumable item fixed in the image processing device 30 from a sensor for detecting the status of each consumable item, and stores the obtained information.

The log manager 306 records log information concerning a log of processing executed by the image processing device 30. The log manager 306 also generates information concerning the usage status of the image processing device 30 (for example, the number of pages output by each user and the number of pages output per day) from the recorded log information.

The order request manager 308 manages information concerning an order request received from a general user PC 10. The order request manager 308 records, for example, the date on which an order request is received, ID information concerning a user sending an order request, and ID code of a consumable item for which an order request is made. The order request manager 308 also accumulates recorded order requests and generates information concerning the order request status to be provided to the administrator. If the order request manager 308 is informed from the order processor 230 of the device driver 200 installed in the administrator PC 20 that the administrator has ordered a certain consumable item from the consumables delivery system 60, it turns ON a flag for information concerning an order request for this consumable item that the order request has been handled (or the order request manager 308 deletes the information concerning this order request). Information concerning an order request for which a flag is turned ON is not reflected in information concerning the order request status to be provided to the administrator.

The consumables-related information supplying unit 310 supplies consumables-related information, such as the remaining amounts of consumables, to the general users and the administrator. The consumables-related information supplying unit 310 supplies, not only information to be supplied to general users, such as the remaining amounts of consumables, but also information unique to the administrator, such as information concerning the order request status and information concerning the usage status of the image processing device 30 generated by the log manager 306, to the administrator.

An example of the consumables screen generated by the consumables screen generator 122 of the device driver 100 for general users will be described below with reference to FIG. 5.

Figure 5:
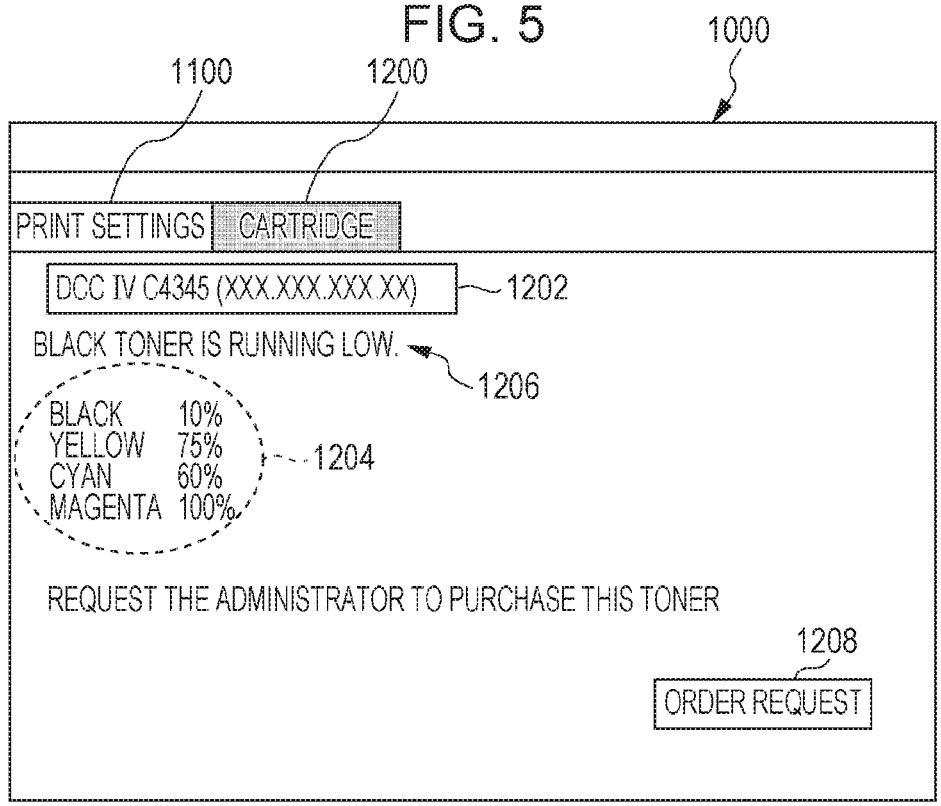
FIG. 5 illustrates an example of a consumables screen (the order request button is displayed) generated by a consumables screen generator of a general user PC.

FIG. 5 illustrates an example of a cartridge screen 1200 indicating the status of toners in toner cartridges, which are typical examples of consumables for the image processing device 30. The cartridge screen 1200 is one screen forming an UI screen 1000 of the device driver 100. The UI screen 1000 also includes a print setting screen 1100 for setting print attributes, such as the output destination printer, the print range, the number of print copies, whether one-sided or two-sided printing will be performed, and whether monochrome or color printing will be performed. The print setting screen 1100 and the cartridge screen 1200 are displayed in a tab format, and in the example shown in FIG. 5, the cartridge screen 1200 is displayed by the selection of a tab of the cartridge screen 1200.

In a printer name field 1202 within the cartridge screen 1200, the printer name of the image processing device 30, which is currently selected as the output destination, is displayed. In a toner level (remaining amount) display field 1204 within the cartridge screen 1200, the percentage of the remaining amount of toner of each color in a cartridge fixed in the image processing device 30 is displayed. If the remaining amount of toner of a certain color is equal to or smaller than a predetermined threshold, a warning message 1206 indicating that toner is running low is displayed. In FIG. 5, the threshold for the toner level (the remaining amount of toner) is set to be 10%, and the level of black toner in the image processing device 30 at the time of the display of the cartridge screen 1200 is reduced to 10%. Accordingly, the warning message 1206 "black toner is running low" is displayed. If the level of toner of a certain color is equal to or smaller than the threshold, an order request button 1208 and a description of the function of the order request button 1208 "request the administrator to purchase this toner" are displayed. If a general user presses the order request button 1208, the order request sender 130 sends an order request for toner (in this case, black toner) for which the warning message 1206 is displayed to the image processing device 30.

Figure 6:
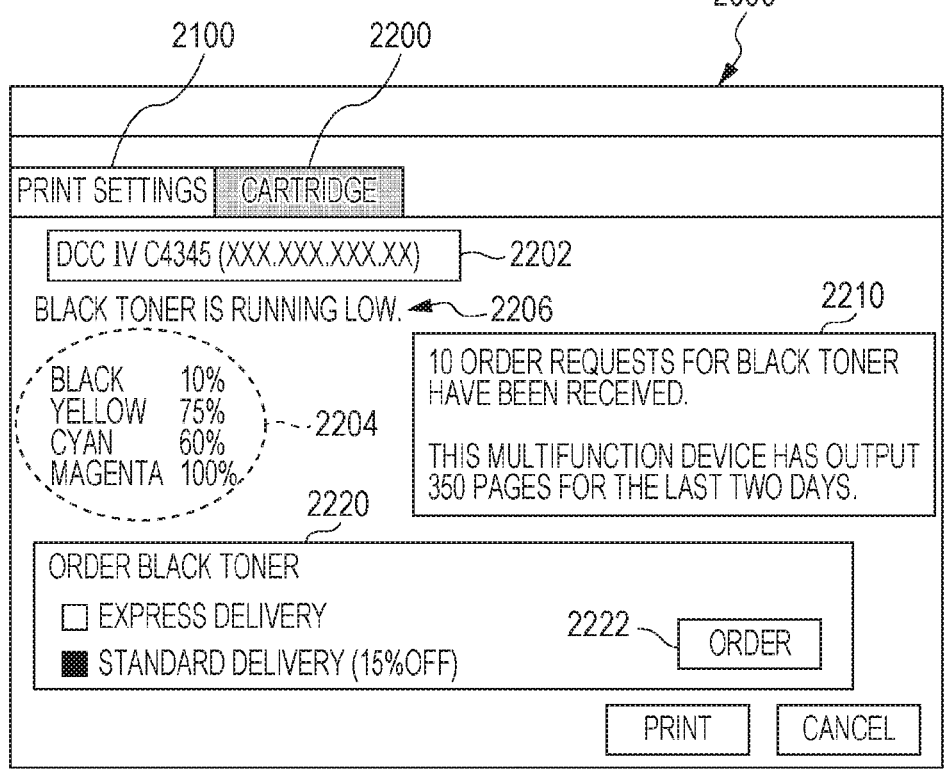
FIG. 6 illustrates an example of a consumables screen generated by a consumables screen generator of an administrator PC.

An example of the consumables screen generated by the consumables screen generator 222 of the device driver 200 for the administrator will be discussed below with reference to FIG. 6. As in the cartridge screen 1200 of the UI screen 1000 for a general user shown in FIG. 5, a cartridge screen 2200 is displayed as one screen forming a UI screen 2000 of the device driver 200 in FIG. 6. The UI screen 2000 also includes a print setting screen 2100. In FIG. 6, as well as in FIG. 5, the level of black toner at the time of the display of the cartridge screen 2200 is reduced to 10%, which is the threshold.

On the cartridge screen 2200, as well as on the cartridge screen 1200 shown in FIG. 5, a printer name field 2202, a toner level (remaining amount) display field 2204, and a warning message 2206 indicating that black toner is running low are displayed.

The cartridge screen 2200 also includes a display field 2210 in which consumables-related information obtained from the image processing device 30 is displayed. In the display field 2210, a message indicating the status of order requests from general users ("ten order requests for black toner have been received") and a message indicating the usage status of the image processing device 30 related to the toner consumption ("this multifunction device has output 350 pages for the last two days") are displayed. Messages may be displayed in the display field 2210 only when an order request from a general user is received.

If the level of toner of a certain color is equal to or smaller than the threshold, an order instruction field 2220 is displayed. In the order instruction field 2220, for black toner at a level which has reached the threshold, options for a delivery method between an express delivery and a standard delivery, and an order button 2222 are indicated. When the administrator selects a delivery method and presses the order button 2222, the order processor 230 sends order data to the consumables delivery system 60. Examples of the order data are the code of a subject consumable item (in this example, black toner), ID information concerning the administrator, which is the purchaser, and ID information concerning the image processing device 30 in which this consumable item is fixed.

Another display example of the cartridge screen 1200 generated by the consumables screen generator 122 of the device driver 100 for a general user will be discussed below with reference to FIG. 7.

Figure 7:
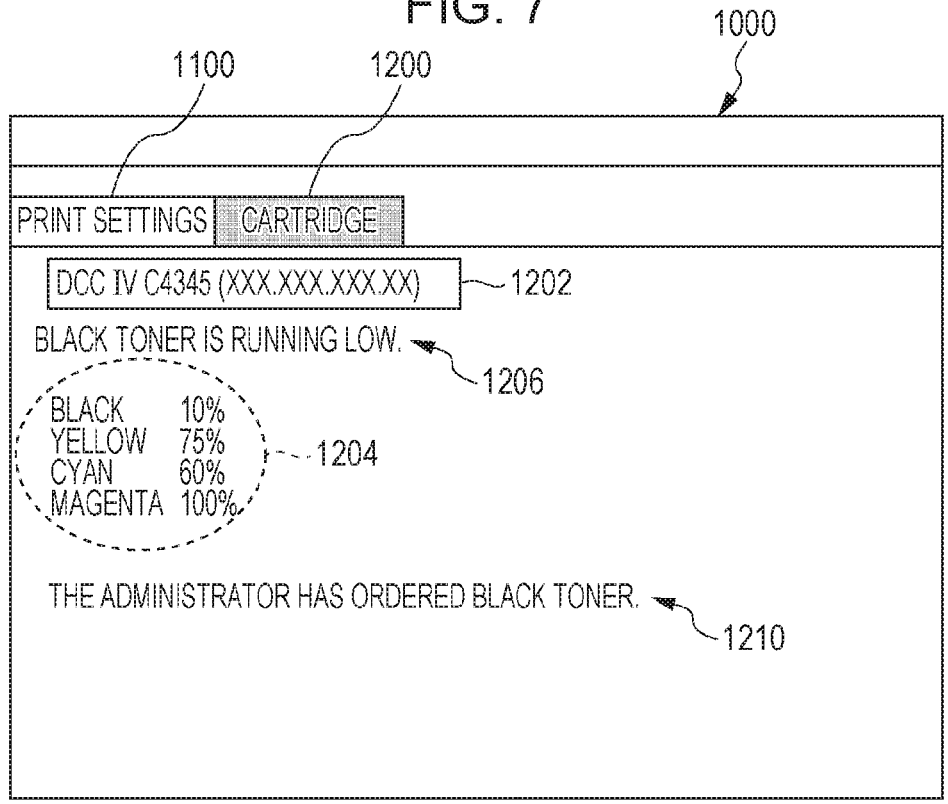
FIG. 7 illustrates another example of a consumables screen (a case in which a consumable item has been ordered) generated by a consumables screen generator of a general user PC.

On the cartridge screen 1200 shown in FIG. 7, unlike the example shown in FIG. 5, the order request button 1208 is not displayed, and instead, a message 1210 "the administrator has ordered black toner" is displayed. The message 1210 is displayed when the administrator has already ordered black toner, which is a subject toner indicated by the warning message 1206, from the consumables delivery system 60. By seeing the message 1210, the general user understands that a black toner cartridge will soon be replaced.

For generating the cartridge screen 1200 shown in FIG. 7, when the administrator has ordered black toner from the consumables delivery system 60, the order processor 230 of the device driver 200 for the administrator supplies consumable-item ordered information indicating that black toner has been ordered to the image processing device 30. Upon receiving this information, the image processing device 30 (for example, the order request manager 308) stores this information, together with the date of order (the date on which the information has been received) and ID information concerning the purchaser. Then, upon receiving access from the device driver 100 for a general user, the consumables-related information supplying unit 310 provides the information indicating that the administrator has ordered black toner to the device driver 100 (consumables-related information obtaining unit 110), together with information indicating that the level (remaining amount) of black toner has reached the threshold. This enables the consumables screen generator 122 to generate the consumables screen 1200 on which a message indicating that black toner has been ordered is displayed instead of the order request button 1208. If information indicating that the remaining amount of a certain consumable item has reached the threshold has been received from the consumables-related information supplying unit 310, but information indicating that such a consumable item has been ordered has not been received from the consumables-related information supplying unit 310, the consumables screen generator 122 displays the order request button 1208 for this consumable item.

After storing information that a certain consumable item has been ordered, if the image processing device 30 has detected that such a consumable item has been replaced, it erases this information.

A control operation for displaying information that the administrator has ordered a certain consumable item has been discussed through illustration of the consumables screen 1200 for a general user in FIG. 7. However, a similar control operation may be performed on the consumables screen 2200 for the administrator. That is, if the consumables-related information obtaining unit 210 of the device driver 200 for the administrator has received information that the remaining amount of a certain consumable item has reached the threshold and information that the administrator has ordered such a consumable item from the image processing device 30, the consumables screen generator 222 generates the consumables screen 2200 on which a message indicating that the consumable item has been ordered is displayed instead of the order instruction field 2220. If the administrator by itself or another administrator registered in the same image processing device 30 has ordered the consumable item, a message indicating that the consumable item has been ordered is displayed instead of the order instruction field 2220 on the consumables screen 2200 until the consumable item is replaced, thereby preventing the occurrence of duplicate orders.

Figure 8:
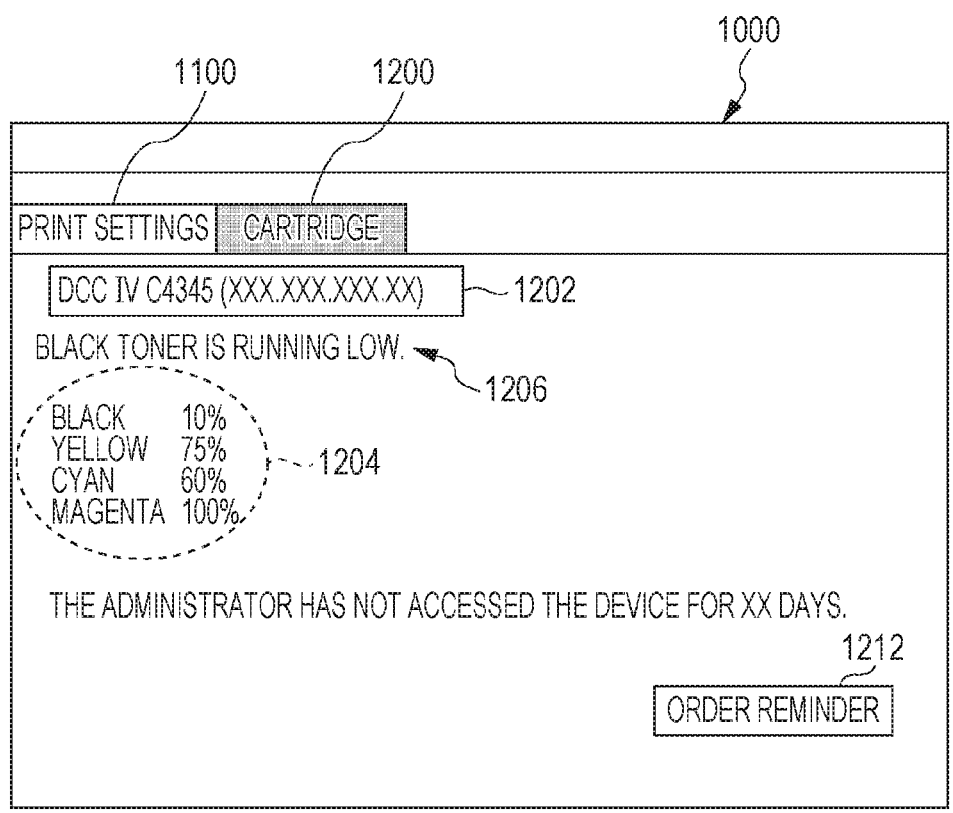
FIG. 8 illustrates another example of a consumables screen (a case in which the administrator has not accessed the image processing device for a long time) generated by a consumables screen generator of a general user PC.

FIG. 8 shows an example of the cartridge screen 1200 displayed on the general user PC 10 when the administrator has not made access to the image processing device 30 for a long time in a situation where the remaining amount of black toner has reached the threshold. In this case, on the cartridge screen 1200, an order reminder button 1212 is displayed, together with a message indicating how many days the administrator has not accessed the image processing device 30 ("device"). When the general user presses the order reminder button 1212, the device driver 100 (for example, the order request sender 130) sends an order reminder message to the consumables delivery system 60. This order reminder message indicates, for example, ID information concerning the image processing device 30, code of a subject consumable item (in this case, black toner), and ID information concerning the administrator. Upon receiving the order reminder message, the consumables delivery system 60 sends an email instructing the administrator to order the subject consumable item to a preregistered email address of the administrator, or supplies information concerning the order reminder message to an operator of the service center, and then, the operator makes arrangements for instructing the administrator to order the subject consumable item by telephone.

It is assumed that the administrator has not accessed the image processing device 30 for a long time in a situation where the warning message 1206 indicating that toner is running low is displayed. In this case, even if a general user makes an order request by pressing the order request button 1208, it is highly likely that information concerning this order request will not be supplied to the administrator. Accordingly, in this example, the function of causing the service center to inform the administrator of such a situation is provided.

For displaying the cartridge screen 1200 shown in FIG. 8, the image processing device 30 (for example, the log manager 306) determines the length of a period for which the administrator has not accessed the image processing device 30 (that is, the period from the previous access time to the current time) from the access history of the administrator, which is part of the log information. This period will be called "a non-access period". If the non-access period is equal to or greater than a predetermined threshold, in response to access from the device driver 100 for a general user, the consumables-related information supplying unit 310 returns information indicating that the administrator has not accessed the image processing device 30 for a long time, together with information indicating that the level (remaining amount) of a subject toner has reached the threshold, to the device driver 100. This enables the consumables screen generator 122 of the device driver 100 to generate the cartridge screen 1200 shown in FIG. 8 on which the order reminder button 1212 is displayed instead of the order request button 1208. In the above-described example, the start point of the non-access period is the administrator's previous access time, but may be a time point at which the remaining amount of a subject toner has reached the threshold or a time point at which the general user has first made an order request for a shortage of this subject toner.

In most cases, unlike a network administrator, the administrator of the image processing device 30 is not dedicated to the management for the image processing device 30, and does not always monitor the status of the image processing device 30. Thus, even if a general user issues an order request by pressing the order request button 1208, if the administrator has not accessed the image processing device 30 for a long time (for example, if printing is not necessary for a while), the administrator does not recognize such an order request. Under such circumstances, by providing the cartridge screen 1200 shown in FIG. 8 to the general user, the administrator can be informed of the current situation by a different route from a regular route through which the image processing device 30 informs the administrator of the shortage status of a consumable item or the order request status.

Another display example of the cartridge screen 2200 generated by the consumables screen generator 222 of the device driver 200 for the administrator will be discussed below with reference to FIG. 9.

Figure 9:
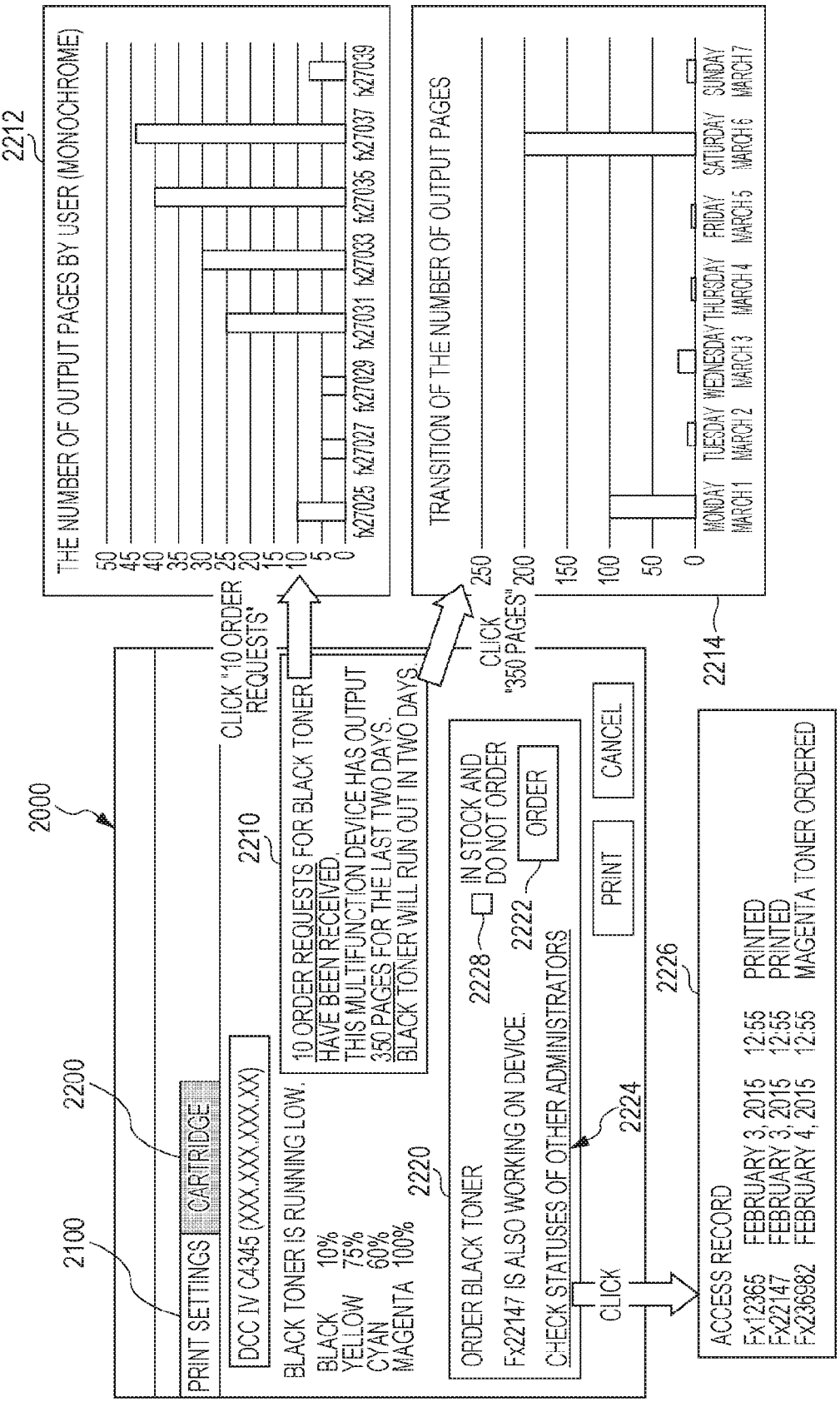
FIG. 9 illustrates another example of a consumables screen (the usage status of the image processing device is displayed) generated by a consumables screen generator of an administrator PC.

On the cartridge screen 2200 shown in FIG. 9, links are added to the number of order requests (ten) and the number of output pages for the last two days (350 pages) within the display field 2210 for consumables-related information. When the administrator selects the link of the number of order requests, a number-of-user-output-pages screen 2212 is displayed as, for example, a popup window, and when the administrator selects the number of output pages, a number-of-output-pages transition screen 2214 is displayed as, for example, a popup window.

On the number-of-user-output-pages screen 2212, a graph representing the number of output pages of monochrome documents per user for the latest predetermined period is displayed, together with ID information concerning the general users of the image processing device 30. The height of each bar represents the number of output pages per user, and the alphanumeric characters under each bar indicate ID information concerning the corresponding user. On the number-of-user-output-pages screen 2212, the numbers of monochrome output pages concerning all the users recorded in the log manager 306 may be displayed, or the numbers of monochrome output pages only concerning general users who have made order requests for black toner, which is currently running low, may be displayed.

On the number-of-output-pages transition screen 2214, a bar graph representing the transition of the number of monochrome output pages according to the day for the latest predetermined period (one week in FIG. 9) is displayed.

In the example shown in FIG. 9, since the toner which is running low (toner level has reached the threshold) is black toner, the number of monochrome output pages is indicated. However, if toner of a color, such as cyan or magenta, other than black is running low (toner level has reached the threshold), the number of color output pages is indicated in the number-of-user-output-pages screen 2212 and the number-of-output-pages transition screen 2214.

By referring to the number-of-user-output-pages screen 2212 and the number-of-output-pages transition screen 2214, the administrator checks the usage status of the image processing device 30 related to the consumable item for which order requests have been made, and decides a timing at which this consumable item will be ordered.

In the example shown in FIG. 9, in the order instruction field 2220, a message indicating the statuses of other administrators ("Fx22147 is also working on the device") and a link 2224 calling a screen indicating the statuses of the other administrators are also displayed. At the time of the display of the cartridge screen 2200, in addition to the administrator viewing the screen shown in FIG. 9, another administrator having ID information "Fx22147" is accessing the image processing device 30. When the administrator viewing the screen shown in FIG. 9 clicks the link 2224, a screen 2226 indicating log information ("access record") managed by the log manager 306 concerning processing operations which have recently been performed on the image processing device 30 by the other administrators is displayed as, for example, a popup window. In the example of the screen 2226 shown in FIG. 9, the dates of recent access to the image processing device 30 and the types of operations performed on the image processing device 30 by three administrators are displayed. This example shows that the administrator "Fx236982" has recently ordered magenta toner and that black toner has not been ordered. When a certain consumable item is running low, if plural administrators are registered for a single image processing device 30, there may be a situation where the administrators individually order this consumable item from the consumables delivery system 60. In this case, the consumables delivery system 60 only accepts the first order, and discards the second and subsequent orders (that is, it does not accept the second and subsequent orders).

In the example shown in FIG. 9, a check box 2228 "in stock and do not order" is indicated in the order instruction field 2220. For example, if the administrator has an extra subject consumable item (in this case, black toner) for some reason and decides to use this extra item for replacement instead of ordering another item, the administrator checks the check box 2228 and presses the order button 2222. If the order button 2222 is pressed in the state in which the check box 2228 is checked, the order processor 230 sends information indicating that the subject consumable item has been ordered to the image processing device 30 instead of ordering this item from the consumables delivery system 60. Then, the general users for the image processing device 30 are informed that the consumable item has been ordered (message 1210 shown in FIG. 7) and understand that it is no longer necessary to send an order request.

Figure 10:
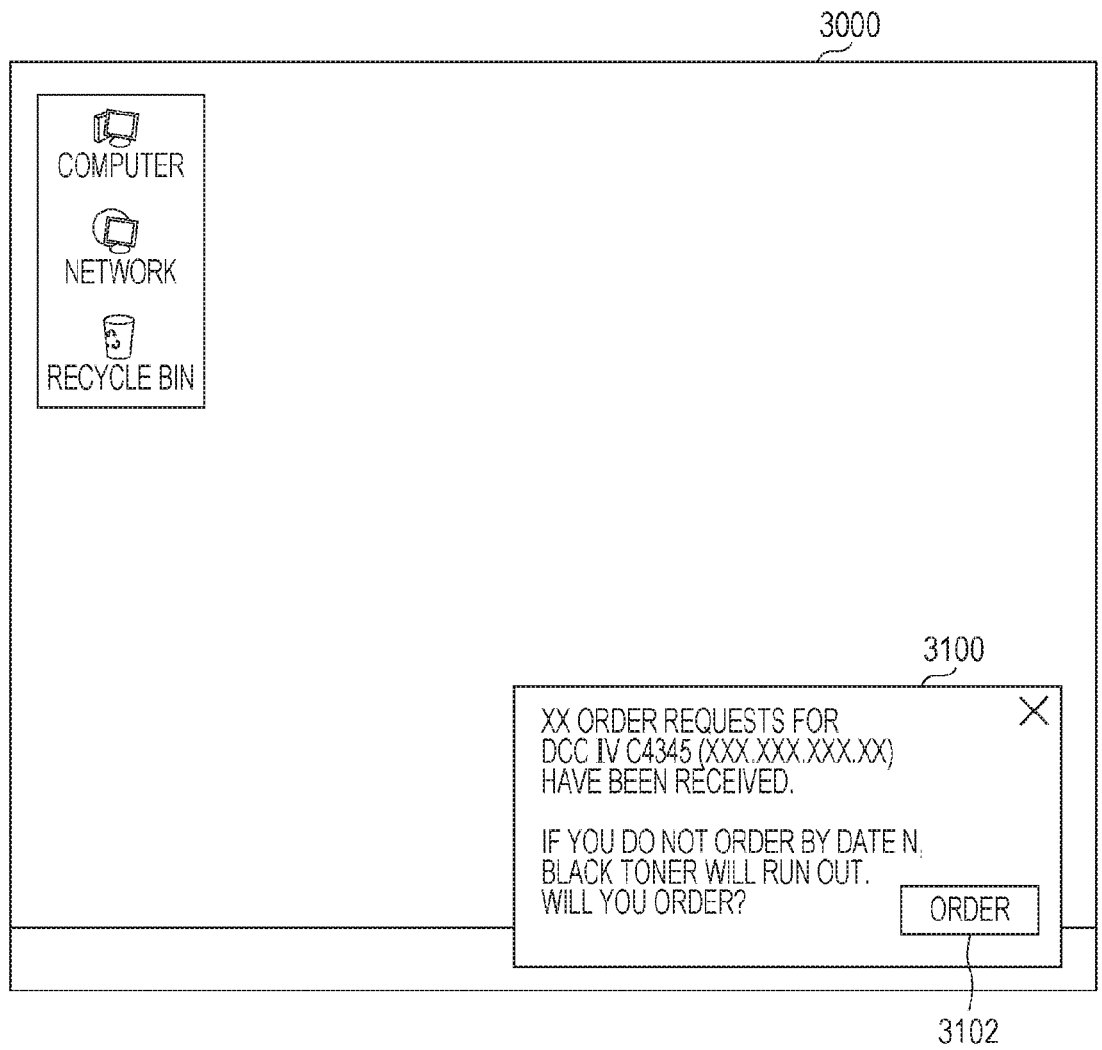
FIG. 10 illustrates an example of consumables-related information displayed on a desktop screen of an administrator PC.

The above-described examples of the screens for the administrator are displayed when the device driver 200 is started. Alternatively, as shown in FIG. 10, on a desktop screen 3000 on the PC 20, a window 3100 indicating information similar to that in the display field 2210 for displaying consumables-related information shown in FIG. 6 may be displayed by using the device driver 200 or a consumables management program dedicated to the administrator. In the window 3100, an order button 3102 is displayed, and when the administrator presses the order button 3102, the order processor 230 orders a subject consumable item from the consumables delivery system 60.

An example of the processing procedure of the system of this exemplary embodiment will now be discussed below.

A common installer program (hereinafter will be simply referred to as the "installer") for device drivers to be installed in the general user PC 10 and the administrator PC 20 are provided to the general user PC 10 and the administrator PC 20. Then, the installer performs installation processing so that the device driver 100 for a general user will be configured in the PC 10 and so that the device driver 200 for an administrator will be configured in the PC 20.

Figure 11:
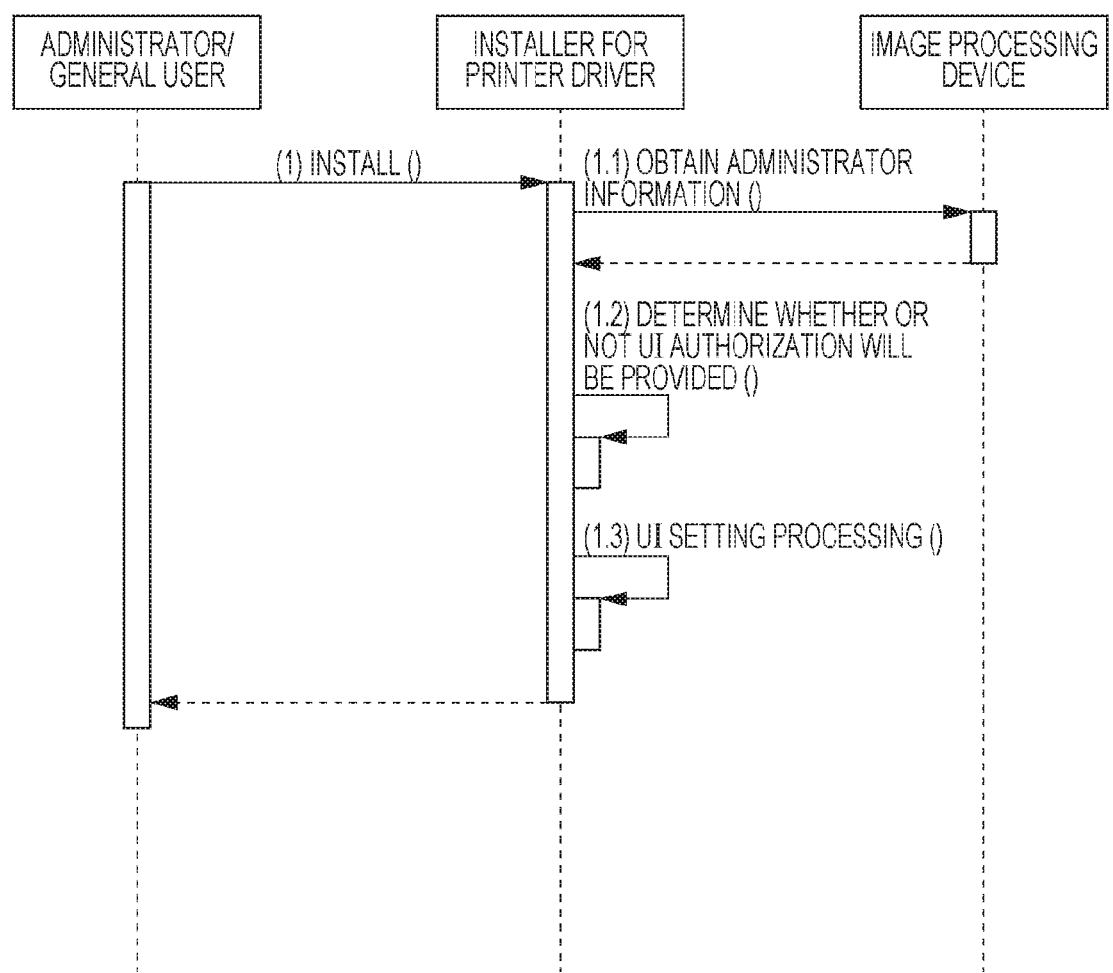
FIG. 11 illustrates an example of a flow of processing for installing a device driver for an image processing device in a PC.

The flow of installation processing will be discussed below with reference to FIG. 11.

(1) A general user and an administrator execute the installer for installing device drivers for the image processing device 30 in the PCs 10 and 20, respectively. (1.1) The executed installer accesses the image processing device 30 and obtains ID information concerning the administrators registered in the image processing device 30. In response to this access, the image processing device 30 returns ID information concerning the administrators stored in the administrator information storage unit 302.

(1.2) Then, the installer determines whether or not any item of the obtained ID information concerning the administrators coincides with the ID information concerning a user operating the PC 10 or 20, that is, whether or not the user operating the PC 10 or 20 is an administrator of the image processing device 30. (1.3) If the installer determines that the user operating the PC 10 or 20 is an administrator, it sets settings for the administrator in a device driver to be installed so as to configure the device driver 200 for the administrator. If the installer determines that the user operating the PC 10 or 20 is not an administrator, that is, if the user is a general user, it sets settings for a general user in a device driver to be installed so as to configure the device driver 100.

An example of the processing procedure of the system of this exemplary embodiment will be discussed below with reference to FIG. 12.

In this procedure, (1) when a general user provides a print instruction to, for example, document editing software running in the PC 10, the device driver 100 is started. When the user selects an image processing device 30 to be used by the user on the print setting screen 1100 of the UI screen 1000 (see FIG. 5) of the device driver 100, the consumables-related information obtaining unit 110 of the device driver 100 accesses the image processing device 30 to obtain status information concerning the image processing device 30. The status information includes consumables-related information. Examples of the consumables-related information are the name of the image processing device 30 selected by the user, information concerning the remaining amount of each consumable item fixed in the image processing device 30, and information concerning the handling status of the administrator for the image processing device 30 (for example, whether or not the administrator has already ordered a consumable item which is running low and whether the administrator has not accessed the image processing device 30 for a long time). (2) The device driver 100 determines the display content of the consumables screen (for example, the cartridge screen 1200 shown in FIG. 5) from the obtained consumables-related information. (3) The device driver 100 then updates the content of the consumables screen to the determined display content. For example, in the example of the cartridge screen 1200 shown in FIG. 5, the device driver 100 reflects the values of the levels (remaining amounts) of toners of individual colors indicated in the obtained consumables-related information in the display content in the toner level (remaining amount) display field 1204, and also, if the remaining amount of toner of a certain color has reached a threshold, the device driver 100 displays the warning message 1206 for this toner and also displays the order request button 1208.

(4) On a consumables screen on which a warning message indicating that a certain consumable item is running low (for example, the warning message 1206 shown in FIG. 5) is displayed, if the user presses the order request button 1208 for this consumable item, the order request sender 130 sends an order request to the image processing device 30. The image processing device 30 then stores this order request.

(5) Thereafter, when the administrator provides a print instruction to, for example, document editing software running in the PC 20, the device driver 200 is started. The consumables-related information obtaining unit 210 of the device driver 200 accesses the image processing device 30 selected by the user so as to obtain status information concerning the image processing device 30. Examples of the status information are the name of the image processing device 30 selected by the user, information concerning the remaining amount of each consumable item fixed in the image processing device 30, and the recent usage status of the image processing device 30 (for example, the transition of the number of monochrome output pages and that of color output pages according to the day), ID information concerning the general users who have sent order requests, the number of recent output pages by these users, the status in which the other administrators have accessed the image processing device 30. (6) The device driver 200 determines the display content of the consumables screen (for example, the cartridge screen 2200 shown in FIG. 6) from the obtained consumables-related information. (7) The device driver 200 then updates the content of the consumables screen to the determined display content. For example, in the example of the cartridge screen 2200 shown in FIG. 6, if the obtained consumables-related information includes information concerning order requests and information concerning the usage status of the image processing device 30, the device driver 200 reflects the content of such items of information in the number of request orders and the number of output pages in the display field 2210, and displays the order button 2222. (8) When the administrator presses the order button 2222, the order processor 230 orders a subject consumable item from the consumables delivery system 60.

There may be a situation where, even if the previous administrator is replaced by a new administrator and the new administrator is registered in the image processing device 30, the device driver in the PC of the previous administrator has not been changed to the device driver for a general user. In such a situation, since the device driver 200 for the administrator is still installed in the PC 20 of the previous administrator, the order button 2222 is displayed on the consumables screen, and it is possible that the previous administrator order a certain consumable item from the consumables delivery system 60 by using the device driver 200. For avoiding such a situation, when the device driver 200 accesses the image processing device 30, it may check ID information concerning the administrator registered in the image processing device 30. If the registered ID information does not coincide with that concerning the user operating the PC, the order processor 230 handles an order instruction provided as a result of pressing the order button 2222 as an error and does not accept the order instruction.

In the above-described example, the device driver 200 is installed in the administrator PC 20, and the device driver 100 is installed in the general user PC 10. Alternatively, the same device driver may be installed in both of the administrator PC 20 and the general user PC 10. Then, when accessing the image processing device 30 (for example, steps (1) and (5) in FIG. 12), the device driver obtains ID information concerning the administrators from the image processing device 30. The device driver then determines whether or not there is an item in the obtained ID information that coincides with ID information concerning the user operating the PC 10 or 20. If there is an item in the obtained ID information that coincides with the ID information concerning the user, the device driver operates in the administrator mode. If there is no item in the obtained ID information that coincides with the ID information concerning the user, the device driver operates in the general user mode. The behavior of the device driver in the administrator mode is similar to that of the above-described device driver 200 for an administrator. The behavior of the device driver in the general user mode is similar to that of the above-described device driver 100 for a general user.

Information processing mechanisms of the PCs 10 and 20 and the image processing device 30 are each implemented by causing a general-purpose computer to execute a program representing the functions of the corresponding one of the PCs 10 and 20 and the image processing device 30. In this case, the computer has a hardware circuit configuration in which a microprocessor, such as a central processing unit (CPU), memory devices (primary storage devices), such as a random access memory (RAM) and a read only memory (ROM), a hard disk drive (HDD) controller for controlling a HDD, various input/output (I/O) interfaces, a network interface for controlling connection with a network, such as a LAN, are connected to one another via, for example, a bus. A disk drive for performing reading and/or writing on a portable disk recording medium, such as a compact disc (CD) and a digital versatile disc (DVD), and a memory reader/writer for performing reading and/or writing on various standards of portable non-volatile recording media, such as a flash memory, may be connected to the bus via an I/O interface. A program describing the processing content of the above-described functional modules is stored in a fixed storage device, such as a HDD, via a recording medium, such as a CD and a DVD, or a communication medium, such as a network, and is installed into the computer. As a result of reading the program stored in the fixed storage device into the RAM and executing the program by the microprocessor, such as a CPU, the above-described functional modules are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
an image processing device;
a general user device; and
an administrator device,
the general user device including:
at least a first processor configured to execute a first obtaining unit that obtains remaining-amount information which indicates a remaining amount of a consumable item from the image processing device; and
a first controller configured to perform control so that first image information which represents the remaining-amount information obtained by the first obtaining unit is displayed;
wherein the at least the first processor is further configured to execute:
a first inputting unit that allows an input of a request to order the consumable item; and
a first sender that sends the inputted request to order the consumable item to the image processing device;
the image processing device including:
at least a second processor configured to execute:
an order request receiver that receives the request to order the consumable item from the general user device; and
a providing unit that provides information concerning the request to order the consumable item received by the order request receiver to the administrator device,
the administrator device including:
at least a third processor configured to execute a second obtaining unit that obtains the remaining-amount information which represents the remaining amount of the consumable item and the information concerning the request to order the consumable item made by the general user device from the image processing device; and
a second controller configured to perform control so that image information indicating the remaining-amount information and the information concerning the request obtained by the second obtaining unit are displayed;
wherein the at least the third processor is further configured to execute:
a second inputting unit that allows an input of an order for the consumable item; and
a second sender that sends the order for the consumable item to a consumables delivery system, and
wherein:
the at least the second processor is further configured to execute a second providing unit, and
in a case where the order for the consumable item is sent to the consumables delivery system;
the second sender sends consumable-item ordered information indicating that the consumable item has been ordered to the image processing device;
the second providing unit provides the consumable-item ordered information received from the second sender to the first obtaining unit;
the first obtaining unit further obtains the consumable-item ordered information; and
the first inputting unit does not allow an input of the request to order the consumable item.

2. The image processing system according to claim 1, wherein the first obtaining unit, the first controller, the first inputting unit, and the first sender are implemented as functions of a device driver which is installed in the general user device and which is used for controlling the image processing device.

3. The image processing system according to claim 1, wherein the second obtaining unit, the second controller, the second inputting unit, and the second sender are implemented as functions of a device driver which is installed in the administrator device and which is used for controlling the image processing device.

4. The image processing system according to claim 1, wherein, the first inputting unit allows an input of the request to order the consumable item in a case where the remaining-amount information obtained by the first obtaining unit indicates that the remaining amount of the consumable item is equal to or smaller than a threshold.

5. The image processing system according to claim 1, wherein, the second inputting unit allows an input of the order for the consumable item in a case where the remaining-amount information obtained by the second obtaining unit indicates that the remaining amount of the consumable item is equal to or smaller than a predetermined threshold.

6. The image processing system according to claim 1, wherein:
in the case where the order for the consumable item is sent to the consumables delivery system;
the second providing unit provides the consumable-item ordered information received from the second sender to the second obtaining unit;
the second obtaining unit further obtains the consumable-item ordered information; and
the second inputting unit does not allow an input of the order for the consumable item.

7. The image processing system according to claim 1, wherein:
the at least the second processor is further configured to execute a history storage unit that stores a history of access from the administrator device to the image processing device, and
if the remaining-amount information obtained by the first obtaining unit indicates that the remaining amount of the consumable item is equal to or smaller than a threshold, and if the history of access stored in the history storage unit indicates that the administrator device has not accessed the image processing device for a predetermined period or longer, the first inputting unit allows an input of a request to remind an administrator using the administrator device of an order for the consumable item.

8. An information processing device comprising:
at least a third processor configured to execute a second obtaining unit that obtains remaining-amount information which represents a remaining amount of a consumable item and information concerning a request to order the consumable item made by a general user device from an image processing device; and
a second controller configured to perform control so that image information indicating the remaining-amount information and the information concerning the request obtained by the second obtaining unit are displayed;
wherein the at least the third processor is further configured to execute:
a second inputting unit that allows an input of an order for the consumable item; and
a second sender that sends the order for the consumable item to a consumables delivery system,
wherein:
in a case where the order for the consumable item is sent to the consumables delivery system:
the second sender sends consumable-item ordered information indicating that the consumable item has been ordered to the image processing device;
a second providing unit of the image processing device provides the consumable-item ordered information received from the second sender to a first obtaining unit of the general user device;
the first obtaining unit further obtains the consumable-item ordered information; and
a first inputting unit of the general user device does not allow an input of the request to order the consumable item.

9. A non-transitory computer readable medium storing a program that, when executed, causes a computer to execute a process, the process comprising:
obtaining remaining-amount information which represents a remaining amount of a consumable item and information concerning a request to order the consumable item made by a general user device from an image processing device;
performing control so that image information indicating the remaining-amount information and the obtained information concerning the request are displayed;
allowing an input of an order for the consumable item;
sending the order for the consumable item to a consumables delivery system; and
in a case where the order for the consumable item is sent to die consumables delivery system:
sending consumable-item ordered information indicating that the consumable item has been ordered to the image processing device;
providing, by the image processing device, the consumable-item ordered information received from the sending consumable-item ordered information to the general user device;
obtaining, by the general user device, the consumable-item ordered information; and
not allowing, by the general user device, an input of the request to order the consumable item.

10. A non-transitory computer readable medium storing a program that, when executed, causes a computer to execute a process, the process comprising:
obtaining identification information concerning an administrator of an image processing device from the image processing device; and
installing a program for causing the computer to function as a general user device if there is no item in the obtained identification information that coincides with identification information concerning a user operating the computer or installing a program for causing the computer to function as an administrator device if there is an item in the obtained identification information that coincides with the identification information concerning the user operating the computer,
the general user device executing:
obtaining remaining-amount information which indicates a remaining amount of a consumable item from the image processing device;
performing control so that first image information which represents the obtained remaining-amount information is displayed;
allowing an input of a request to order the consumable item; and
sending the inputted request to order the consumable item to the image processing device,
the administrator device executing:
obtaining the remaining-amount information which represents the remaining amount of the consumable item and information concerning the request to order the consumable item made by the general user device from the image processing device;
performing control so that image information indicating the remaining-amount information and the obtained information concerning the request are displayed;
allowing an input of an order for the consumable item;
sending the order for the consumable item to a consumables delivery system; and
in a case where the order for the consumable item is sent to the consumables delivery system:
sending, by the administrator device, consumable-item ordered information indicating that the consumable item has been ordered to the image processing device;
receiving, by the general user device, the consumable-item ordered information, which was received by the image processing device from the sending the consumable-item ordered information, and then provided to the general user device by the image processing device;
obtaining, by the general user device, the consumable-item ordered information; and
not allowing, by the general user device, an input of the request to order the consumable item.

11. A non-transitory computer readable medium storing a program that, when executed, causes a computer to execute a process, the process comprising:
obtaining identification information concerning an administrator of an image processing device from the image processing device; and
performing control so that the computer will function as a general user device if there is no item in the obtained identification information that coincides with identification information concerning a user operating the computer and so that the computer will function as an administrator device if there is an item in the obtained identification information that coincides with the identification information concerning the user operating the computer,
the general user device executing:
obtaining remaining-amount information which indicates a remaining amount of a consumable item from the image processing device;
performing control so that first image information which represents the obtained remaining-amount information is displayed;
allowing an input of a request to order the consumable item; and
sending the inputted request to order the consumable item to the image processing device,
the administrator device executing:

obtaining the remaining-amount information which represents the remaining amount of the consumable item and information concerning the request to order the consumable item made by the general user device from the image processing device;

performing control so that image information indicating the remaining-amount information and the obtained information concerning the request are displayed;

allowing an input of an order for the consumable item;

sending the order for the consumable item to a consumables delivery system; and in a case where the order for the consumable item is sent to the consumables delivery system:

sending, by the administrator device, consumable-item ordered information indicating that the consumable item has been ordered to the image processing device;

receiving, by the general user device, the consumable-item ordered information, which was received by the image processing device from the sending the consumable-item ordered information, and then provided to the general user device by the image processing device;

obtaining, by the general user device, the consumable-item ordered information; and not allowing, by the general user device, an input of the request to order the consumable item.

* * * * *